United States Patent

Selwitz

[15] 3,689,577
[45] Sept. 5, 1972

[54] PROCESS FOR HALOGENATING PARAFFINS AND CYCLOALKANES

[72] Inventor: Charles M. Selwitz, Pitcairn, Pa.
[73] Assignee: Gulf Research & Development Company, Pittsburgh, Pa.
[22] Filed: March 25, 1970
[21] Appl. No.: 22,711

[52] U.S. Cl. ............................260/648 R, 260/659 R
[51] Int. Cl. ....C07c 17/10, C07c 19/00, C07c 23/10
[58] Field of Search ........................260/648 R, 659 R

[56] References Cited

UNITED STATES PATENTS 2,366,518  1/1945  Grebe et al. ............260/648 R

FOREIGN PATENTS OR APPLICATIONS 6,411,864  4/1965  Netherlands...........260/659 R

*Primary Examiner*—Daniel D. Horwitz
*Attorney*—Meyer Neishloss, Deane E. Keith and Joseph J. Carducci

[57]  ABSTRACT

A process for chlorinating or brominating a paraffin or a cycloalkane which involves heating a paraffin or a cycloalkane with chloride or bromide ions, nitrate ions, sulfuric acid and water.

14 Claims, No Drawings

PROCESS FOR HALOGENATING PARAFFINS AND CYCLOALKANES

This invention relates to a process for chlorinating or brominating a paraffin or cycloakanes.

Chlorination or bromination of paraffinic hydrocarbons can be effected, for example, by passing gaseous chlorine or bromine therethrough under appropriate reaction conditions. These processes are undesirable, however, for with the production of one mol of the halogenated paraffinic hydrocarbon or cycloalkane, one mol of undesired, and generally unuseable, HCl or HBr is also produced. A technique has been developed whereby HCl is used to chlorinate lower molecular weight paraffinic materials, or cycloalkanes such as methane or ethane, but this oxychlorination involves a vapor phase reaction with oxygen and high temperatures. Such process is not feasible for higher molecular weight paraffins or cycloalkanes, however, since the halogenation is accompanied by oxidation.

I have found that chlorination or bromination of paraffins or cycloalkanes can easily be effected, without resorting to vapor phase reactions, and good conversions and high yields to desired product can be attained, by heating said paraffin or cycloalkane in the presence of chloride or bromide ions, nitrate ions, sulfuric acid and water.

The paraffinic hydrocarbon that can be halogenated herein can be a straight chain, branched chain or cyclic hydrocarbon having at least one carbon atom, preferably from two to 400,000 carbon atoms, but most particularly from six to 40 carbon atoms. Paraffinic hydrocarbons carrying substituents that do not adversely affect the course or nature of the reaction, for example, a halogen substituent or a carboxylic acid substituent, can also be used. Examples of such paraffinic materials and cycloalkanes are n-pentane, isopentane, n-hexane, cyclohexane, 2-methylpentane, n-heptane, n-octane, cyclooctane, ethylcyclohexane, n-nonane, 4-propyloctane, n-decane, n-undecane, n-dodecane, n-octadecane, n-pentacosane, n-heptacontane, 24-n-dodecylnonacontane, polyethylene, polypropylene, cyclododecane, methylcyclohexane, 1,2,4-trimethylcyclononane, methyl iodide, methyl bromide, cyclohexyl chloride, 3-fluoroheptane, 1,2-dichloroethane, ethyl bromide, ethyl iodide, n-propyl chloride, 1,2,3-trichloropropane, 1,4-dichlorobutane, 1,4-dibromohexane, 1-chlorododecane, 2-chlorododecane, 3-chlorododecane, 4-chlorododecane, 5-chlorododecane, 6-chlorododecane, 3-bromopentatriacontane, acetic acid, propionic acid, butyric acid, dodecanoic acid, cyclohexyl carboxylic acid, cyclohexyl acetic acid, 11-chlorododecanoic acid, subaric acid, etc.

There must be present in the reaction system chloride ions or bromide ions in sufficient quantities to halogenate the paraffinic compound or cycloalkane defined above. By "chloride ions or bromide ions" I mean a singly negatively charged chlorine or bromine atom. Although the chloride ion or bromide ion can be obtained from many compounds, desirably such ion is obtained from a compound that is readily capable of dissociating in the present reaction system to chloride or bromide ions, such as hydrogen chloride, hydrogen bromide, ammonium chloride, ammonium bromide, organic chlorides and bromides, such as aniline hydrochloride, methyl amine hydrochloride, benzyl trimethyl ammonium bromide and metallic chlorides and bromides, such as sodium chloride, potassium bromide, rubidium chloride, magnesium bromide, cupric chloride, barium chloride, calcium chloride, aluminum bromide, etc. Of these I prefer to use hydrogen chloride or hydrogen bromide. The amount of chloride or bromide ion present in the system relative to the paraffin or cycloalkane on a molar basis can be, for example, from about 20:1 to about 1:5, preferably from about 4:1 to about 1:2.

In order to obtain the desired conversion herein it is imperative that the above materials be brought into contact with each other in the presence of nitrate ions. Any compound which by ionization, oxidation or disproportionation under the reaction conditions defined herein will result in the production of nitrate ions can be employed. By "nitrate ions" I mean to include $NO_3$, a singly charged anion containing one nitrogen atom and three oxygen atoms. Examples of compounds that can be employed include nitric acid, sodium nitrate, cesium nitrate, etc. Of these I prefer to employ nitric acid. The amount of nitrate ion employed, on a molar basis, relative to the paraffin or cycloalkane charge, can be from about 2:1 to about 1:50, preferably from about 1:2 to about 1:10.

Also required in the reaction system is sulfuric acid and water. The amount of sulfuric acid present, on a molar basis, based upon the paraffin, is from about 20:1 to about 1:5, preferably from about 1:1 to about 5:1, and water present, on a molar basis, relative to the paraffin or cycloalkane is from 100:1 to about 5:1, preferably from about 30:1 to about 10:1.

As defined above the reaction is carried out in an inert atmosphere, for example, in a nitrogen atmosphere. In a preferred embodiment, however, the reaction is carried out in the presence of molecular oxygen. When this is done, less nitrate ion is required and conversion of paraffin or cycloalkane is increased. The amount of molecular oxygen that can be employed relative to the paraffin or cycloalkane, on a molar basis, can be from about 100:1 to about 1:5, preferably from about 10:1 to about 1:1.

As to reaction conditions, the temperature can be from about 50° to about 150° C., preferably from about 60° to about 120° C., the pressure from about 0.5 to about 5,000 pounds per square inch gauge, preferably from about 10 to about 500 pounds per square inch gauge, and the reaction time from about 0.5 to about 50 hours.

At the end of the reaction period the alkyl halide produced, which can carry one or more halogens thereon, can be recovered from the reaction mixture in any suitable manner, for example, by distillation at a temperature of about 25° to about 250° C. and a pressure of about 0.01 to about 2 pounds per square inch gauge. Depending upon the boiling points of the products in the reaction mixture, the individual components thereof, including the desired chloro or bromo paraffin or chloro or bromo cycloalkane, will come off individually overhead and can thus be easily recovered.

The process of the invention can further be illustrated by the following.

A series of runs was carried out in which the reaction mixture was placed in a 200-milliliter, thick-walled glass reactor, provided with a magnetic stirrer. In each run, except for Run No. 26, the mixture was heated to a predetermined temperature level and an oxygen pressure of 170 pounds per square inch gauge, which pressure was maintained by adding oxygen to the reaction system as it was consumed. In Run No. 26 the oxygen pressure was maintained at 50 pounds per square inch gauge. At the end of each run the reactor was cooled, depressured and the contents removed for analysis. The results obtained are tabulated below in TABLES I, II, III, IV and V.

TABLE I

| Run No. | Hydrocarbon charge | Wt. in gms. | Wt. in gms. of 37% aqueous HCl | H$_2$O, gms. | 70 percent aqueous HNO$_3$ in grams | Mineral acid added | Wt. in gms. | Gas | Metal compound added | Wt. in gms. | Temp., °C. | Time, hours | Percent hydrocarbon converted | Products obtained |
|---|---|---|---|---|---|---|---|---|---|---|---|---|---|---|
| 1 | Dodecane | 35.0 | 44.5 | 49.5 | 12.0 | H$_2$SO$_4$ | 59.2 | N$_2$ | | | 80 | 0.9 | 0.24 | See Table II. |
| 2 | do | 35.0 | 44.5 | 49.5 | 12.0 | H$_2$SO$_4$ | 59.2 | N$_2$ | | | 80 | 2.0 | 14.5 | Do. |
| 3 | do | 35.0 | 44.5 | 49.4 | 12.0 | 85 percent aqueous H$_3$PO$_4$ | 68.3 | N$_2$ | | | 80 | 1.33 | 1.8 | Do. |
| 4 | do | 35.0 | 44.5 | 25.0 | 12.0 | | | O$_2$ | | | 80 | 1.0 | 4.6 | Only 0.9 percent chlorododecanes. |
| 5 | do | 35.0 | 44.5 | 25.0 | 4.0 | | | O$_2$ | | | 100 | 2.0 | 3.2 | |
| 6 | do | 35.0 | 40.0 | 119.3 | 4.0 | | | O$_2$ | | | 100 | 4.7 | | No reaction. |
| 7 | do | 35.0 | 40.0 | 119.3 | 4.0 | | | O$_2$ | | | 80 | 5.3 | | Do. |
| 8 | do | 35.0 | 44.6 | 49.5 | 4.0 | H$_2$SO$_4$ | 59.2 | O$_2$ | CuSO$_4\cdot$5H$_2$O | 0.5 | 100 | 3.0 | 27.0 | See Table II. |
| 9 | do | 35.0 | 44.6 | 49.5 | 4.0 | 85 percent aqueous H$_3$PO$_4$ | 68.3 | O$_2$ | | | 80 | 2.5 | 4.0 | Do. |
| 10 | do | 7.0 | 8.9 | 4.8 | 0.8 | 70 percent aqueous HClO$_4$ | 16 | O$_2$ | | | 80 | 2.5 | 2.8 | Do. |
| 11 | do | 35.0 | 44.6 | 49.5 | 4.0 | H$_2$SO$_4$ | 59.2 | O$_2$ | | | 100 | 6.0 | 50.2 | 26 percent monochlorododecanes; percent dichlorododecanes. |
| 12 | do | 35.0 | 44.6 | 49.5 | 4.0 | H$_2$SO$_4$ | 59.2 | O$_2$ | | | 80 | 6.0 | 46.5 | 28 percent monochlorododecanes; 13.5 percent dichlorododecanes. |
| 13 | do | 35.0 | 44.6 | 49.5 | 4.0 | H$_2$SO$_4$ | 59.2 | O$_2$ | Palladium acetate | 0.45 | 100 | 6.0 | 62.5 | Product distribution similar to run No. 11. |
| 14 | Isopentane | 35.0 | 44.6 | 49.5 | 4.0 | H$_2$SO$_4$ | 59.2 | O$_2$ | do | 0.45 | 100 | 6.0 | 54.0 | Do. |
| 15 | 1,2-dichloroethane | 35.0 | 44.6 | 60.1 | 1.0 | H$_2$SO$_4$ | 59.2 | O$_2$ | do | 0.45 | 60 | 6.0 | >1.0 | 1,1,2-trichloroethane. |
| 16 | Monochlorocyclohexane | 20.0 | (²) | 49.5 | 4.0 | H$_2$SO$_4$ | 59.2 | O$_2$ | do | 0.45 | 90 | 6.0 | 6.0 | See table III. |
| 17 | do | 35.0 | 44.6 | 49.5 | 4.0 | H$_2$SO$_4$ | 59.2 | O$_2$ | | | 120 | 0.5 | 17.5 | Do. |
| 18 | 135° F. melting point wax | 35.0 | 44.6 | 49.5 | 4.0 | H$_2$SO$_4$ | 59.2 | O$_2$ | | | 90 | 5.0 | 11.6 | Chloroparaffin product containing 9.8 percent chlorine. |
| 19 | do | | | | | | | | | | | | | | |
| 20 | Dodecane | 35.0 | | 40.0 | 4.0 | H$_2$SO$_4$ | 59.2 | O$_2$ | | | 90 | 1.0 | 6.6 | Only monobromododecanes. |
| 21 | Dodecane-1 | 35.0 | (³) | 40.0 | 4.0 | H$_2$SO$_4$ | 59.2 | O$_2$ | | | 80 | 2.0 | 30.0 | No chlorohydrocarbons formed. Product is complex mixture of oxidation and nitration products. |

¹ Unless otherwise indicated.
² 61.3 grams of 48 percent aqueous HBr.
³ 75.6 grams of 48 percent aqueous HBr.

TABLE II

Distribution of Isomers in Product

| | Percent by weight of | | | |
|---|---|---|---|---|
| Run No. | n-Dode-cylch-loride | 2-Chlorododecane and 3-Chlorododecane | 4-Chlorododecane, 5-Chlorododecane and 6-Chlorododecane | Dich-lorodo-decanes |
| 1 | 0 | 0.24 | 0 | 0 |
| 2 | 1.5 | 4.3 | 6.4 | 2.3 |
| 3 | 0.1 | 0.6 | 1.1 | 0 |
| 8 | 2.6 | 6.6 | 10.5 | 7.3 |
| 9 | 0 | 2.7 | 1.3 | 0 |
| 10 | 0.2 | 0.9 | 1.6 | 0 |

TABLE III.—DISTRIBUTION OF DICHLOROCYCLOHEXANE PRODUCTS ISOMERIC DICHLOROCYCLOHEXANES

| Run No. | 1,1- | Trans 1,2- | Trans 1,3- | Trans 1,4- | Cis 1,2- | Cis 1,3- | Cis 1,4- |
|---|---|---|---|---|---|---|---|
| 17 | 3.6 | 33.5 | 21.7 | 11.2 | 2.5 | 11.3 | 11.3 |
| 18 | 1.5 | 37.8 | 21.2 | 10.6 | 2.6 | 15.7 | 10.6 |

TABLE IV

| Run No. | Hydrocarbon charge | Wt. in gms. | Wt. in gms. of 37% aqueous HCl | H$_2$O, gms. | 70 percent aqueous HNO$_3$, grams | H$_2$SO$_4$ grams | Metal compound added | Wt. in gms. | Temp., °C. | Time, hours | Percent hydrocarbon converted | To Mono-chloro-cyclo-hexane | Di-chloro-cyclo-hexane |
|---|---|---|---|---|---|---|---|---|---|---|---|---|---|
| 22 | Cyclohexane | 35.0 | 44.6 | 49.5 | 4.0 | 59.2 | | | 80 | 6.0 | 19.7 | 15.2 | 4.5 |
| 23 | do | 35.0 | 44.6 | 49.5 | 4.0 | 59.2 | | | 60 | 6.0 | 12.2 | 9.0 | 3.2 |
| 24 | do | 35.0 | 44.6 | 49.5 | 4.0 | 59.2 | | | 120 | 1.5 | 10.6 | 7.4 | 3.2 |
| 25 | do | 35.0 | 44.6 | 24.8 | 4.0 | 59.2 | | | 90 | 6.0 | 2.4 | 18.2 | 2.5 |
| 26 | do | 35.0 | 44.6 | 24.8 | 4.0 | 59.2 | | | 90 | 6.0 | 6.6 | 4.9 | 1.7 |
| 27 | do | 69.4 | 44.6 | 49.5 | 4.0 | 84.0 | | | 90 | 6.3 | 8.4 | 6.8 | 1.8 |
| 28 | do | 35.0 | 44.6 | 49.5 | 4.0 | 59.5 | | | 90 | 5.75 | 7.0 | 5.8 | 1.2 |
| 29 | do | 35.0 | 44.6 | 49.5 | 4.0 | 59.5 | | | 90 | 5.3 | 11.4 | 9.1 | 2.3 |
| 30 | do | 35.0 | 44.6 | 49.5 | 4.0 | 59.5 | | | 100 | 1.0 | 20.1 | 15.9 | 4.2 |
| 31 | do | 35.0 | 44.6 | 49.5 | 4.0 | 59.5 | | | 110 | 3.75 | 12.9 | 10.4 | 2.5 |
| 32 | do | 35.0 | 44.6 | 49.5 | 4.0 | 59.5 | | | 105 | 2.5 | 16.9 | 13.7 | 3.2 |
| 33 | do | 35.0 | 44.6 | 49.5 | 4.0 | 59.5 | | | 105 | 3.0 | 16.4 | 14.0 | 2.4 |
| 34 | do | 35.0 | 44.6 | 49.5 | 4.0 | 59.5 | | | 100 | 0.75 | 20.6 | 17.3 | 3.3 |
| 35 | do | 35.0 | 44.6 | 49.5 | 4.0 | 59.5 | Palladium acetate | 0.45 | 100 | 5.0 | | 8.0 | |
| 36 | do | 35.0 | 44.6 | 49.5 | 4.0 | 59.5 | do | 0.45 | 60 | 6.5 | 11.9 | 8.4 | 3.5 |
| 37 | do | 35.0 | 44.6 | 49.5 | 4.0 | 59.5 | do | 0.50 | 120 | 1.5 | 10.0 | 7.3 | 2.7 |
| 38 | do | 35.0 | 44.6 | 49.5 | 4.0 | 59.2 | Cupric acetate·5H$_2$O | 5.0 | 100 | 4.5 | 16.7 | 13.6 | 3.1 |
| 39 | do | 35.0 | 44.6 | 49.5 | 4.0 | 59.2 | do | 5.0 | 60 | 6.0 | 10.0 | 7.4 | 2.6 |
| 40 | do | 35.0 | 44.6 | 49.5 | 4.0 | 59.2 | do | 0.45 | 120 | 1.5 | 7.8 | 5.7 | 2.1 |
| 41 | do | 35.0 | 44.6 | 49.5 | 4.0 | 59.2 | Palladium acetate | | 90 | 6.0 | 21.7 | 16.5 | 5.2 |
| 42 | do | 35.0 | 44.6 | 49.5 | 4.0 | 59.2 | Ferric chloride | 2.0 | 90 | 6.0 | 17.9 | 10.9 | 7.0 |
| 43 | do | 35.0 | 44.6 | 49.5 | 4.0 | 59.2 | Cupric sulfate·5H$_2$O | 2.5 | 90 | 6.0 | 17.0 | 10.9 | 6.1 |
| | do | 35.0 | 44.6 | 49.5 | 4.0 | 59.2 | | | 90 | 6.0 | 21.6 | 17.0 | 4.6 |

TABLE V.—DISTRIBUTION OF DICHLOROCYCLOHEXANES OF RUNS ANALYZED IN TABLE IV, PERCENT BY WEIGHT

| Run No. | 1,1- | Trans 1,2- | Trans 1,3- | Trans 1,4- | Cis 1,2- | Cis 1,3- | Cis 1,4- |
|---|---|---|---|---|---|---|---|
| 1 | 55.7 | 21.7 | 8.5 | 4.4 | 0.8 | 5.8 | 3.3 |
| 3 | 23.5 | 59.9 | 6.2 | 3.0 | 0.3 | 4.6 | 2.2 |
| 12 | 71.3 | 17.4 | 5.0 | 1.9 | 0.6 | 2.4 | 1.3 |
| 14 | 72.6 | 14.7 | 5.9 | 1.8 | Trace | 4.6 | 0.4 |
| 20 | 36.1 | 48.3 | 4.3 | 2.0 | Trace | 7.0 | 2.3 |

A study of the data in the above tables clearly illustrates the advantages of operating in accordance with the process defined and claimed herein. Note that when the system contains a paraffin or cycloalkane, halogen ions, nitrate ions, sulfuric acid and water successful halogenation of the paraffin or cycloalkane occurs. Run No. 21 shows that olefins cannot be halogenated by the procedure described herein. That sulfuric acid is critical is apparent from Runs Nos. 3, 9 and 10 wherein either phosphoric acid or perchloric acid were used in place of sulfuric acid with inferior results. The presence of cupric sulfate, palladium acetate, cupric acetate, ferric chloride or cupric sulfate in Runs Nos. 7, 13, 14, 15, 16, 34, 35, 36, 37, 38, 39, 40, 41, 42 and 43 shows that none had any real effect on the conversion of paraffin or cycloalkane when these runs are compared with runs in the Tables under the similar reaction conditions but in the absence of metal salts. In Run No. 15 bromination proceeded successfully to isoamyl bromides, but it was difficult to analyze the product because of the volatility of the isopentane and isoamyl bromides.

Obviously, many modifications and variations of the invention, as hereinabove set forth, can be made without departing from the spirit and scope thereof, and therefore only such limitations should be imposed as are indicated in the appended claims.

I claim:

1. A process for preparing chloro paraffins, bromo paraffins, chloro cycloalkanes or bromo cycloalkanes which comprises heating a paraffin having from one to 40 carbon atoms or a cycloalkane with a source of chloride ions or bromide ions in admixture with a source of nitrate ions, sulfuric acid and water in the liquid phase at a temperature of about 50° to about 150°C. wherein the amount of chloride ion or bromide ion present relative to the paraffin or cycloalkane on a molar basis is from about 20:1 to about 1:5, the amount of nitrate ion on a molar basis relative to the paraffin or cycloalkane is from about 2:1 to about 1:50, the amount of sulfuric acid on a molar basis relative to the paraffin or cycloalkane is from about 20:1 to about 1:5 and the amount of water on a molar basis relative to the paraffin or cycloalkane is from about 100:1 to about 5:1.

2. The process of claim 1 wherein said paraffin charge has from two to 40 carbon atoms.

3. The process of claim 1 wherein said paraffin charge has from six to 40 carbon atoms.

4. The process of claim 1 wherein said halogen ion is obtained from a source of chloride ions.

5. The process of claim 1 wherein said halogen ion is obtained from a source of bromide ions.

6. The process of claim 1 wherein said halogen ion is obtained from hydrogen chloride.

7. The process of claim 1 wherein said halogen ion is obtained from hydrogen bromide.

8. The process of claim 1 wherein said nitrate ion is obtained from nitric acid.

9. The process of claim 1 wherein said reaction is carried out in the additional presence of molecular oxygen, wherein the amount of oxygen on a molar basis relative to the paraffin or cycloalkane is from about 100:1 to about 1:5.

10. The process of claim 1 wherein the reaction temperature is about 60° to about 120°C.

11. The process of claim 1 wherein said paraffin is dodecane.

12. The process of claim 1 wherein said paraffin is isopentane.

13. The process of claim 1 wherein said paraffin is a paraffin wax.

14. The process of claim 1 wherein said cycloalkane is cyclohexane.

* * * * *

UNITED STATES PATENT OFFICE
CERTIFICATE OF CORRECTION

Patent No. 3,689,577          Dated   September 5, 1972

Inventor(s)   Charles M. Selwitz

It is certified that error appears in the above-identified patent and that said Letters Patent are hereby corrected as shown below:

Column 1, line 6, after "bons", please insert "or cycloalkanes".

Column 3, Table I, last column of Run 11, please insert "30" before "percent dichlorododecanes".

Column 4, Table IV, Run No. 25, column 11, "2.4" should read "23.4".

Signed and sealed this 29th day of January 1974.

(SEAL)
Attest:

EDWARD M. FLETCHER, JR.
Attesting Officer

RENE D. TEGTMEYER
Acting Commissioner of Patents